(12) United States Patent
Plavetich et al.

(10) Patent No.: US 7,537,522 B2
(45) Date of Patent: May 26, 2009

(54) IN-VEHICLE GAMING SYSTEM

(75) Inventors: Richard Plavetich, Laguna Beach, CA (US); John Cupit, Olivenhain, CA (US)

(73) Assignee: Nissan Design America, Inc., San Diego, CA (US)

( * ) Notice: Subject to any disclaimer, the term of this patent is extended or adjusted under 35 U.S.C. 154(b) by 172 days.

(21) Appl. No.: 11/317,676

(22) Filed: Dec. 23, 2005

(65) Prior Publication Data

US 2007/0149284 A1   Jun. 28, 2007

(51) Int. Cl.
  A63F 9/24    (2006.01)
  A63F 13/00   (2006.01)
  A63F 9/14    (2006.01)
  G06F 17/00   (2006.01)
  G06F 19/00   (2006.01)

(52) U.S. Cl. .............................. 463/36; 434/29; 434/66
(58) Field of Classification Search .................... 463/36; 434/29, 66
See application file for complete search history.

(56) References Cited

U.S. PATENT DOCUMENTS

| | | | | |
|---|---|---|---|---|
| 4,174,833 A | * | 11/1979 | Hennig et al. ............... | 273/442 |
| 5,816,920 A | * | 10/1998 | Hanai ........................... | 463/42 |
| 6,010,403 A | * | 1/2000 | Adam et al. .................... | 463/6 |
| 6,053,815 A | * | 4/2000 | Hara et al. ..................... | 463/46 |
| 6,505,503 B1 | * | 1/2003 | Teresi et al. .................... | 73/117 |
| 6,575,836 B1 | * | 6/2003 | Nishimura .................... | 463/46 |
| 2002/0018982 A1 | * | 2/2002 | Conroy ......................... | 434/62 |
| 2004/0110565 A1 | * | 6/2004 | Levesque ...................... | 463/42 |
| 2006/0009289 A1 | * | 1/2006 | McCarten et al. ............. | 463/42 |

OTHER PUBLICATIONS

Mark Vaughn, Spirited Speedster: It Lets You Race Even When It's in Park (Auto Week), Nov. 14, 2005, pp. 16-17.

* cited by examiner

Primary Examiner—John M Hotaling, II
Assistant Examiner—Adetokunbo Torimiro
(74) Attorney, Agent, or Firm—Young Basile

(57) ABSTRACT

The in-vehicle gaming system is comprised of vehicle controls that are adapted to provide both vehicle control during a normal driving mode and game control inputs during a gaming mode. At least one of the controls is selectively disengaged from the vehicle control during the gaming mode. A display provides an indication to the driver of the game environment in response to the game control inputs.

21 Claims, 2 Drawing Sheets

IN-VEHICLE GAMING SYSTEM

BACKGROUND OF THE INVENTION

Gaming systems generally use game controllers to provide input to the game processor in order to indicate an action on a display. For example, a joystick controller or game pad with buttons may be used to allow a person to interact with the game on the display.

Some gaming systems may have a dedicated controller to input the desired actions. Aircraft games can use dedicated aircraft-type cockpit controls that connect to the game console. Automobile games can use dedicated steering wheels and gas/brake pedals that connect to the game console.

SUMMARY

The present invention encompasses an in-vehicle gaming system that does not require dedicated controls to input actions to the game. The controls in the vehicle itself are used as the control inputs and outputs.

One embodiment of the present invention encompasses an in-vehicle gaming system. The system is comprised of vehicle controls that are adapted to provide both vehicle control during a normal driving mode and, when selectively disengaged from vehicle control during a gaming mode, game control inputs. A display provides an indication of the game environment in response to the game control inputs.

Further embodiments of the invention include methods and apparatus of varying scope.

DETAILED DESCRIPTION

Figure 1:
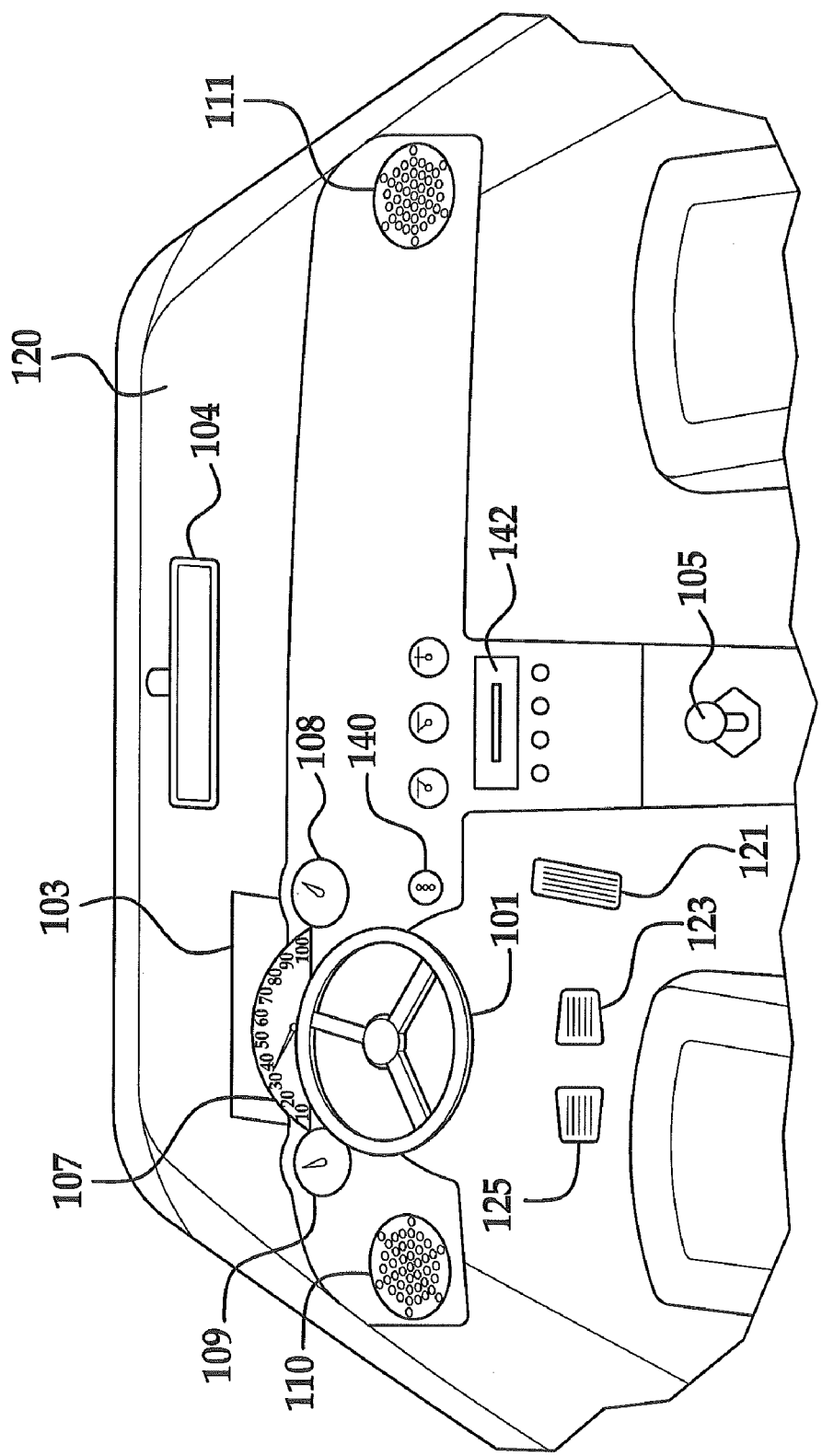
FIG. 1 shows a diagram of one embodiment of the in-vehicle gaming system of the present invention.

In the following detailed description of the invention, reference is made to the accompanying drawings that form a part hereof and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. The following detailed description is, therefore, not to be taken in a limiting sense, and the scope of the present invention is defined only by the appended claims and equivalents thereof.

FIG. 1 illustrates one embodiment of the in-vehicle gaming system of the present invention. The vehicle illustrated in FIG. 1 is an automobile. However, the present invention is not limited to any one type of vehicle. Alternate embodiments can use substantially the same scheme in a truck, a bus, an aircraft, or any other type of vehicle.

The in-vehicle gaming system uses the actual vehicle to provide the controls and displays for input and feedback of the game indications and actions. The controls can include for example the automobile steering wheel 101, the gear shifter 105, the gas pedal 121, the brake 123, and the clutch pedal 125. In one embodiment, each of these controls has the same function in the gaming mode as it does in real-life driving.

The vehicle controls 101, 105, 121, 123, 125 have sensors that provide the inputs to the game system processor indicating movement of a respective control. For example, a sensor on the steering wheel 101 indicates to the game processor that the wheel 101 is being turned in a particular direction and how far. Sensors on the other controls indicate movement and activation of their particular function.

The vehicle controls 101, 105, 121, 123, 125, in one embodiment, also have motors or other feedback devices that allow the gaming system to provide driving feedback to the driver through a respective control. For example, the steering wheel 101 may have a device that provides varying resistance to the turning of the wheel 101 to simulate different track surfaces, water/ice on the track, or foreign objects on the road. Similarly, vibration inducing devices can be used to provide realistic, dynamic feedback to the driver to simulate changing road surfaces or off-road surfaces.

To eliminate damage to any of the vehicle components during the gaming mode, the controls are selectively disengaged from their normal connections in the car. For example, if a mechanical linkage connects the steering wheel to the front wheels for steering, this linkage is disengaged when the gaming mode is initiated. In alternate embodiments, the automobile steering is performed by an electrical connection in what is typically referred to as a "drive-by-wire" system or the steering wheel is disengaged from the steering column. In such an embodiments, the electrical connection is switched to the gaming mode so that the front wheels are not moved during the gaming mode.

In one embodiment, the selective disengagement only disengages the steering wheel 101 since the other controls do not cause any damage when used during gaming mode. In another embodiment, all of the controls are disengaged.

The vehicle gauges 107-109, in one embodiment, are used by the gaming system to provide indications to the user. The gauges 107-109 may include the speedometer 107, the tachometer 109, and engine operating parameters 108 such as coolant temperature, oil temperature, and/or oil pressure. Each of these gauges are controlled by the gaming system to provide the same vehicle status indications during the game that they do during a normal driving session. The gauges 107-109, in one embodiment, are also selectively disengaged from their respective normal connections during the gaming mode.

Figure 2:
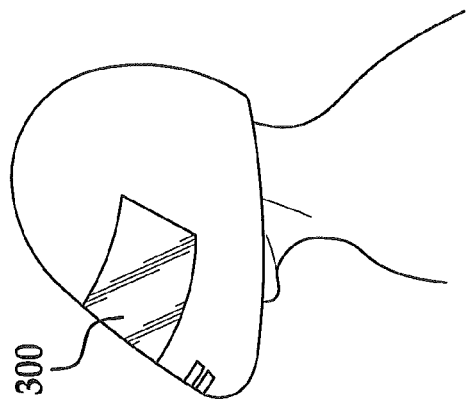
FIG. 2 shows a more detailed diagram of the mirror/display in accordance with the embodiment of FIG. 1.

The game environment (i.e., driving course, scenery, other vehicles) that is used during the gaming mode can be shown to the driver in various ways. In one embodiment, a heads-up display 103 is located on the windshield 120 and the video of the game is projected onto the display 103 or onto a wall or other screen external to the vehicle. An alternate embodiment uses a flip-down display 104 that is integrated into the rearview mirror. One such embodiment is illustrated in FIG. 2 that is described subsequently. Another alternate embodiment uses an external screen such as an LCD, CRT, or the like.

Figure 3:
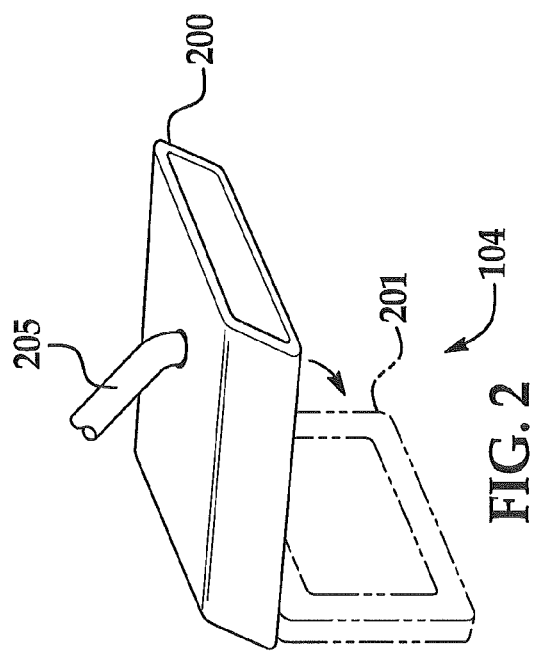
FIG. 3 shows a diagram of an alternate embodiment for a display in accordance with the embodiment of FIG. 1.

In another embodiment, the driver may wear a helmet, goggles, or glasses onto which the driving game is projected/shown. One such embodiment is illustrated in FIG. 3 that is also described subsequently.

In yet another alternate embodiment, the mirror surface of the rearview mirror 104 is a two-way mirror in that a liquid crystal display (LCD) is built into the mirror assembly. When the LCD is on during the gaming mode, it shows through the mirror surface. When the LCD is off during normal driving, only the reflective qualities of the mirror are seen. This embodiment is used in one embodiment to show "vehicles" that are approaching the game vehicle from behind during game play as would be seen during normal driving.

The external side mirrors could be used in a substantially similar manner. As in the internal rearview mirror, the external side mirrors could have the LCD panel built behind the two-way mirror and, during game play, show the peripheral vehicles and scenery that would normally be associated with a driving game.

The engine sounds as well as other gaming sounds are transmitted to the driver through the vehicle sound system. Speakers 110, 111 of the vehicle sound system are shown in FIG. 1. In an alternate embodiment, the driver wears earphones of some type.

The gaming mode of the vehicle is initiated, in one embodiment, by turning the ignition switch 140 in the opposite direction from the ignition position. This position may be in the same direction as the "accessory" position but located at a different detent in that direction. An alternate embodiment initiates the gaming mode by turning to a position in the same direction as the ignition position but in a detent that is prior to the ignition position. Still other embodiments may use other ways to initiate the gaming mode such as extra buttons or switches.

Figure 4:
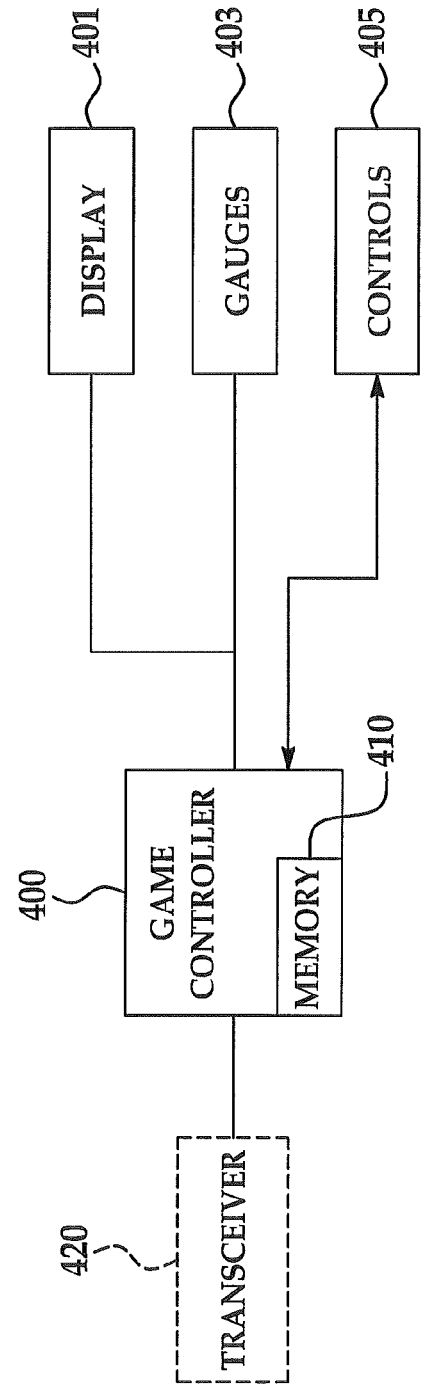
FIG. 4 shows a block diagram of one embodiment of the in-vehicle gaming system of the present invention.

The game software may be permanently stored in the vehicle memory, as illustrated in FIG. 4. Alternate embodiments store one or more games, tracks and/or races in the vehicle memory and allow alternate games, races, tracks, and/or vehicles to be loaded from a memory cartridge containing the code or a DVD or CD loaded into the vehicle sound system CD player 142. Still other embodiments can load the game code through other means such as through a wireless network connection (i.e., WI-FI).

The operating characteristics of the vehicle that the driver is driving might be substantially similar to the vehicle in which they are sitting. In an alternate embodiment, different vehicle characteristics can be loaded with the external memory cartridge/DVD/CD/wireless connection.

FIG. 2 illustrates one embodiment of the rearview mirror 104 with the integrated display of the present invention. In one embodiment, the mirror surface 200 is formed on the top of the display and the display 201 is revealed to the driver when the unit is flipped downward. A connection 205 couples the mirror/display to the vehicle and also include the electrical connections required to drive the display.

The display 201 can be used to show the entire driving game to the driver. In an alternate embodiment, the display can be used to show only the view that would be seen by a typical rearview mirror during a driving session.

In one embodiment, the display is an LCD. Alternate embodiments may use other display technologies such as plasma or cathode ray tube. The details of such a display are described in greater detail in commonly owned U.S. patent application Ser. No. 11/316,666 entitled MIRROR/DISPLAY ASSEMBLY.

FIG. 3 illustrates another embodiment of a scheme for projecting a driving course to the driver. This embodiment uses a racing helmet in which the visor 300 comprises a surface onto which a video is projected from a projector built into the helmet. In another embodiment, the visor is an LCD panel, or some other type of display, that can be used as a miniature monitor to display the game. Sensors in the helmet sense when the driver changes the position of his head and adjust the game display accordingly.

FIG. 4 illustrates a block diagram of one embodiment of the system of the present invention. The system illustrated is comprised of a game controller 400 that includes a game processor for controlling the system. The controlling includes disengaging the vehicle controls, generating the gaming environment to be displayed (both visual and aural response), providing the feedback control to the various vehicle controls, receiving the vehicle control inputs, as well as other game control functions.

The controller 400 can also include any memory 410 required by the system such as RAM, ROM, flash memory, or magnetic/optical memory drives. The controller 400 can also include and input/output ports required to communicate with other portions of the game system.

The controller 400 is coupled to the display 401 as discussed previously. The controller 400 can then generate the video output required by the game and display it for the driver on the display 401. Any suitable display such as those described above may be used with the system.

The gauges 403 are used by the controller 400 to provide speed and/or engine condition indications to the driver as previously disclosed. Similarly, the controls 405 (i.e., steering wheel, gas pedal) are coupled to the controller 400 to allow the driver to input control orientation and to allow the controller 400 to provide feedback to the driver.

In one embodiment, an optional transceiver 420 allows the gaming system to be connected to another system either wirelessly (e.g., BLUETOOTH) or a wired connection (e.g., USB, FIREWIRE). This allows the game to be used against other in-vehicle gaming systems, to receive updates to code, to receive updated gaming code, or the like.

In summary, the in-vehicle gaming system enables the normal vehicle controls to be used as they would be used in a normal driving situation. By simply activating a switch, the gaming mode is initiated with no additional game controls required.

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any adaptations or variations of the invention. It is manifestly intended that this invention be limited only by the following claims and equivalents thereof.

What is claimed is:

1. A self-contained in-vehicle gaming system in a wheeled vehicle comprising:
    at least one in-vehicle control member controlling the wheeled vehicle during a normal driving mode, wherein, when selectively disengaged from the vehicle control, the at least one in-vehicle control member instead provides game control inputs during a gaming mode in which the wheeled vehicle's wheels are stationary; and
    a display located in the wheeled vehicle for providing an indication of a game environment in response to the game control inputs.

2. The system of claim 1 wherein the vehicle is one of an automobile, a bus, or an aircraft.

3. The system of claim 1 wherein the at least one in-vehicle control member comprises at least of a steering wheel, a gas pedal, a brake pedal, a clutch pedal, and a shifter.

4. The system of claim 3 further comprising a plurality of in-vehicle control members, wherein the plurality of in-vehicle control members are all disengaged during the gaming mode.

5. The system of claim 3 wherein the plurality of in-vehicle control members includes a steering wheel, and wherein only the steering wheel is disengaged during the gaming mode.

6. The system of claim 1 wherein the display comprises a rearview mirror display that displays the game environment.

7. The system of claim 6 wherein the rearview mirror display shows only that portion of the game environment associated with a rear view of the wheeled vehicle.

8. A self-contained in-vehicle gaming system for use with a wheeled vehicle that physically transports passengers comprising:
    vehicle controls that provide vehicle control input during normal vehicle operation;
    a game controller located within the wheeled vehicle for selectively disabling the wheeled vehicle controls that provide vehicle control input so as to disable normal vehicle operation and selectively enabling the same vehicle controls to provide game control inputs during game operation, in which the wheeled vehicle's wheels are stationary;
    wherein the game controller further controls operation of the gaming system in response to the game control inputs from the disabled vehicle controls during game operation;
    at least one display located within the vehicle and coupled to the game controller for providing an indication of a game environment in response to the game control input; and
    a sound system coupled to the game controller for providing an aural response to the game control input.

9. The system of claim 8 wherein the game controller provides feedback to the disabled vehicle controls, the feedback including dynamic steering wheel resistance in response to game operation.

10. The system of claim 8 wherein the at least one display comprises at least one of a two-way mirror coupled to a display panel, a visor display in a helmet, a heads-up display on a windshield, a display on glasses, an LCD screen, or an external display.

11. The system of claim 8 wherein each mirror in the wheeled vehicle comprises a two-way mirror in front of a display that shows only that portion of the game environment associated with the respective mirror.

12. The system of claim 8 wherein the wheeled vehicle further comprises vehicle gauges for indicating vehicle speed and status, the vehicle gauges coupled to the game controller for providing indications from the game controller in response to gaming control input from the disabled vehicle controls during the game operation.

13. The system of claim 8 wherein the game controller accepts update game code from one of a DVD, a CD, a memory cartridge, or over a network connection.

14. The system of claim 13 wherein the network connection comprises a wireless connection.

15. The system of claim 8 wherein the vehicle controls further comprise an ignition switch that is coupled to the game controller and causes the game controller to activate the game operation.

16. A method for operating a self-contained in-vehicle gaming system with a wheeled vehicle having gauges and vehicle controls that operate in a normal driving mode, the method comprising;
    initiating a game mode in which the wheeled vehicle's wheels are stationary;
    selectively disengaging at least one vehicle control from the normal driving mode in response to the game mode initiation, wherein, when selectively disengaging from the normal driving mode, the at least one vehicle control instead provides game control inputs during the game mode;
    generating a game environment within the wheeled vehicle that is displayed to a driver;
    accepting game inputs from the disengaged vehicle controls; and
    adapting the game environment in response to the game inputs.

17. The method of claim 16 wherein the game mode is initiated by selecting game mode on a vehicle ignition switch.

18. The method of claim 16 wherein the at least one vehicle control disengaged comprises the steering wheel and the gauges.

19. The method of claim 16 wherein displaying the game environment to the driver includes creating a video display and an aural output.

20. The method of claim 16 and further including generating indications of vehicle status on at least one vehicle gauge in response to the game environment and inputs from the disengaged vehicle controls.

21. A computer-readable medium having computer executable instructions for controlling a programmable self-contained in-vehicle gaming system in a wheeled vehicle comprising:
    initiating a game mode in which the wheeled vehicle' wheels are stationary;
    selectively disengaging at least one vehicle control from a normal driving mode in response to the game mode initiation, wherein, when selectively disengaging from the normal driving mode, the at least one vehicle control instead provides game control inputs during the game mode;
    generating a game environment that is displayed within the wheeled vehicle to a driver;
    accepting game inputs from the disengaged vehicle controls; and
    adapting the game environment in response to the game inputs.

* * * * *